(No Model.)
H. Q. MAURINO.
WHEEL AND AXLE.
No. 364,426. Patented June 7, 1887.
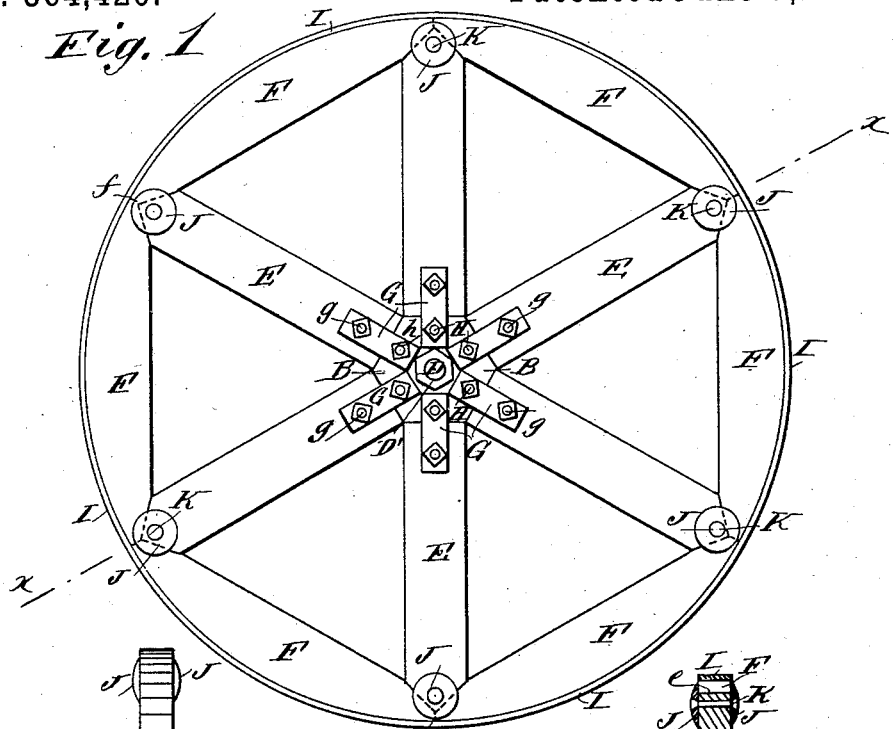
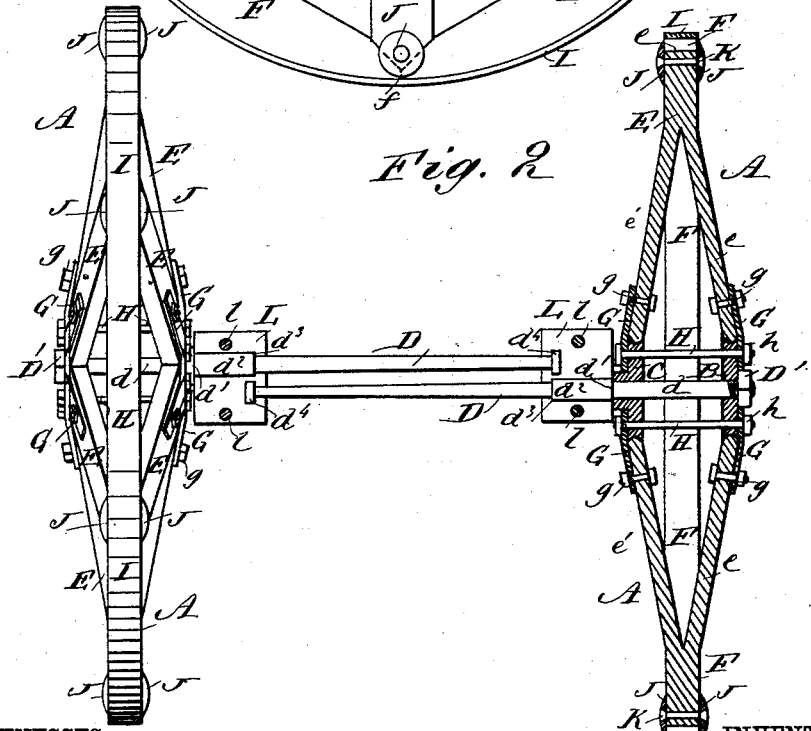
WITNESSES:
C. Neveux
C. Sedgwick
INVENTOR:
H. Q. Maurino
BY Munn & Co.
ATTORNEYS.

United States Patent Office.

HENRY Q. MAURINO, OF ALBUQUERQUE, TERRITORY OF NEW MEXICO.

WHEEL AND AXLE.

SPECIFICATION forming part of Letters Patent No. 364,426, dated June 7, 1887.

Application filed November 29, 1886. Serial No. 220,181. (No model.)

*To all whom it may concern:*

Be it known that I, HENRY Q. MAURINO, of Albuquerque, in the county of Bernalillo and Territory of New Mexico, have invented a new and Improved Wheel, of which the following is a full, clear, and exact description.

My invention relates to vehicle-wheels, and has for its object to provide an improved wheel onto which the tire may be placed without heating it, and may be tightened when necessary.

The invention consists in certain novel features of construction and combinations of parts of the wheel, all as hereinafter fully described and claimed.

Reference is to be had to the accompanying drawings, forming a part of this specification, in which similar letters of reference indicate corresponding parts in both the figures.

Figure 1 is a side view of a wheel made in accordance with my invention, and Fig. 2 is a view of a pair of wheels on axles constituting a two-wheeled truck, one of the wheels being in transverse section on the line $x$ $x$, Fig. 1, and the cap-plates of the axle-boxes being removed.

I make the wheel A with two metal hub-plates, B C, which fit upon the arm $d$ of the axle D. The peripheries of the plates B C are made in polygonal or flat-sided form, and are preferably concaved to receive the forked inner ends of the wheel-spokes E, the outer ends of which are beveled or cut backward angularly from the center to both edges and fit into correspondingly-shaped recesses made in the inner edges of adjacent ends of two of the felly-sections F of the wheel, the apex of the angular end of each spoke standing as a wedge at the end joint, $f$, between two felly-sections which the spoke abuts, as most clearly shown in Fig. 1 of the drawings.

The forked parts or arms $e$ $e'$ of the spokes E, which engage the hub-plates B C, respectively, are held to the edges of the plates by metal straps or braces G, which are held at one end to the forked spoke-arms by bolts $g$, and are held at their other ends to the hub-plates by bolts H, which pass clear through the body of the wheel. The heads of the bolts H stand outside of the braces G at the inner face or hub-plate of the wheel, and the nuts $h$ of the bolts stand outside of the braces G at the outer face or hub-plate of the wheel, and whereby when the nuts $h$ are tightened the wheel hub-plates B C will be forced toward each other to expand the spokes against the felly-sections F and force them tightly to the wheel-tire L, which may be placed on the wheel without heating it in the usual way, and by occasionally tightening the nuts $h$ of the bolts H the body of the wheel may be expanded to compensate for shrinking of it or stretching of the tire; hence the tire may always be held tightly on the wheel until the wheel wears out, and as the bolt-nuts $h$ are tightened from time to time the retaining-nut D' on the extremity of the axle-arm may also be tightened to hold the wheel securely to the axle.

To prevent lateral displacement of the angular outer ends of the spokes from the felly-sections, I provide washers J J, held by a rivet, K, passed through the end of the spoke, so as to hold the washers in place to overlap the end part of the spoke and the faces of both ends of the felly-sections which the spoke abuts, one of the washers being at each face of the wheel, as clearly shown in the drawings.

The axles D D, on which the two wheels A A are mounted, are each formed with an enlargement, $d^2$, one end of which provides the shoulder $d'$, against which the wheel hub-plate C abuts, as above stated, and the other end of the part $d^2$ forms a shoulder, $d^3$, and said part $d^2$ and a short portion of the axle next to it are journaled in a correspondingly-shaped box or bearing formed in upper and lower plates to be bolted to the body or head-block of a vehicle. The lower box or bearing-plate, L, only is shown in the drawings, which show the bolts $l$, by which each pair of box-plates are to be held to place.

At the inner extremity of each of the axles D there is formed an enlargement or collar, $d^4$, which is journaled on a correspondingly-shaped bearing formed in the box-plates L next the opposite wheel; in other words, the end collar, $d^4$, of one axle D is journaled in the box L, in which the main bearing $d^2$ of the other axle is journaled, as clearly shown in Fig. 2 of the drawings.

This arrangement of axles shows a preferred manner of putting the wheels to use, and each wheel is free to rotate independently of the other; but it is obvious that the wheels may be used with any style of axle.

I make special mention of the form of the spokes E, they being made in one piece, forked at their inner parts and with practically solid outer ends, which latter offer less resistance to the travel of the wheel over soft roads, as the wheels will collect and carry less mud or earth with them than wheels in which the outer ends of spokes cross each other or are separately fixed next each other to the felly, while at the same time the forked inner parts, $e\ e$, of the spokes will yield to allow the felly-sections to be expanded by the wedge-shaped ends of the spokes when the hub-plate bolts are tightened, as hereinbefore explained.

Having thus described my invention, what I claim as new, and desire to secure by Letters Patent, is—

1. The combination, in a vehicle-wheel, of hub-plates B C, adapted to receive an axle, forked spokes E, fitted by their arms onto the peripheries of the hub-plates and having angular outer ends, felly-sections F, shaped at their end joints to receive the angular ends of the spokes, a tire fitted on the felly-sections, and draw-bolts H, fitted in the opposite hub-plates, substantially as described, for the purposes set forth.

2. In a wheel, the combination, with hub-plates B C, forked spokes E, felly-sections F, bolts H, and tire I, arranged substantially as specified, of retaining-plates G, secured to the faces of the hub-plates and spokes, substantially as described, for the purpose set forth.

3. In a wheel, the combination, with a wheel-hub, spokes, felly-sections, and tire, and devices expanding the felly-sections by endwise pressure of the spokes at the felly-joints, substantially as specified, of retaining washers or plates J J, held at the faces of the wheel to overlap the ends of the spokes and the felly-sections, substantially as described, for the purpose set forth.

HENRY Q. MAURINO.

Witnesses:
   JESSE M. WHEELOCK,
   L. SELVA.